(12) United States Patent
Emslander et al.

(10) Patent No.: US 10,774,245 B2
(45) Date of Patent: Sep. 15, 2020

(54) ADHESIVE TAPES

(71) Applicant: 3M INNOVATIVE PROPERTIES COMPANY, St. Paul, MN (US)

(72) Inventors: Jeffrey O. Emslander, Grant, MN (US); Ann R. Fornof, Austin, TX (US); Rafael Garcia-Ramirez, Austin, TX (US); Jay M. Krieger, Eau Claire, WI (US); Gregg A. Patnode, Woodbury, MN (US); Robert B. Rosner, Austin, TX (US); Christopher J. Rother, Hudson, WI (US); Jose P. de Souza, Austin, TX (US); Jacob D. Young, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 171 days.

(21) Appl. No.: 15/972,879

(22) Filed: May 7, 2018

(65) Prior Publication Data

US 2018/0327638 A1 Nov. 15, 2018

Related U.S. Application Data

(60) Provisional application No. 62/505,408, filed on May 12, 2017.

(51) Int. Cl.
*C09J 7/50* (2018.01)
*C09J 7/38* (2018.01)
(Continued)

(52) U.S. Cl.
CPC ............... *C09J 7/50* (2018.01); *B32B 25/042* (2013.01); *B32B 25/08* (2013.01); *B32B 25/12* (2013.01); *B32B 25/16* (2013.01); *B32B 27/08* (2013.01); *B32B 27/20* (2013.01); *B32B 27/22* (2013.01); *B32B 27/304* (2013.01); *B32B 27/306* (2013.01); *B32B 27/308* (2013.01); *B32B 27/32* (2013.01); *C09J 7/245* (2018.01); *C09J 7/383* (2018.01); *C09J 7/385* (2018.01); *C09J 125/10* (2013.01); *C09J 133/08* (2013.01);
(Continued)

(58) Field of Classification Search
None
See application file for complete search history.

(56) References Cited

U.S. PATENT DOCUMENTS 3,027,337 A  3/1962  Tritsch
4,181,752 A  1/1980  Martens
(Continued)

FOREIGN PATENT DOCUMENTS

CN  101412591  3/2012
EP  0352901  8/1995
(Continued)

OTHER PUBLICATIONS

International Search Report for PCT/IB2018/053165, dated Jul. 12, 2018, 5 pp.

(Continued)

*Primary Examiner* — Frank D Ducheneaux
(74) *Attorney, Agent, or Firm* — Janet A. Kling (57) ABSTRACT

Adhesive tapes include a plasticized polyvinyl chloride backing, a primer including an ethylene/carbon monoxide-containing terpolymer, and an adhesive.

13 Claims, 1 Drawing Sheet

(51) Int. Cl.
  *C09J 7/22* (2018.01)
  *C09J 125/10* (2006.01)
  *C09J 133/08* (2006.01)
  *B32B 25/08* (2006.01)
  *B32B 25/12* (2006.01)
  *B32B 25/16* (2006.01)
  *B32B 27/08* (2006.01)
  *B32B 27/20* (2006.01)
  *B32B 27/22* (2006.01)
  *B32B 27/32* (2006.01)
  *B32B 25/04* (2006.01)
  *B32B 27/30* (2006.01)
  *C09J 7/24* (2018.01)

(52) U.S. Cl.
  CPC ....... *B32B 2250/03* (2013.01); *B32B 2250/24* (2013.01); *B32B 2270/00* (2013.01); *B32B 2405/00* (2013.01); *C09J 2203/326* (2013.01); *C09J 2407/003* (2013.01); *C09J 2421/00* (2013.01); *C09J 2423/043* (2013.01); *C09J 2425/00* (2013.01); *C09J 2427/00* (2013.01); *C09J 2427/006* (2013.01); *C09J 2431/003* (2013.01); *C09J 2433/00* (2013.01); *C09J 2453/003* (2013.01)

(56) References Cited

U.S. PATENT DOCUMENTS

| | | |
|---|---|---|
| 4,329,384 A | 5/1982 | Vesley |
| 4,330,590 A | 5/1982 | Vesley |
| 4,619,979 A | 10/1986 | Kotnour |
| 4,713,273 A | 12/1987 | Freedman |
| 4,737,559 A | 4/1988 | Kellen |
| 4,843,134 A | 6/1989 | Kotnour |
| 5,232,786 A | 8/1993 | Waters |
| 5,407,970 A | 4/1995 | Peterson |
| 5,407,971 A | 4/1995 | Everaerts |
| 5,447,789 A | 9/1995 | Griffin |
| 5,500,293 A | 3/1996 | Lau |
| 5,637,646 A | 6/1997 | Ellis |
| 5,804,610 A | 9/1998 | Hamer |
| 6,025,070 A | 2/2000 | Heederik |
| 6,040,027 A | 3/2000 | Freedman |
| RE36,855 E | 9/2000 | Bredahl |
| 6,432,530 B1 | 8/2002 | Garcia-Ramirez |
| 6,579,601 B2 | 6/2003 | Kollaja |
| 8,980,967 B2 | 3/2015 | Krepski |
| 9,238,702 B1 | 1/2016 | Fornof |
| 2003/0049415 A1 | 3/2003 | Pedginski |
| 2003/0077439 A1* | 4/2003 | Neubert ............. C09J 7/245 428/343 |
| 2009/0061221 A1 | 3/2009 | Li |
| 2013/0184393 A1 | 7/2013 | Satrijo |
| 2013/0260149 A1 | 10/2013 | Clapper |
| 2015/0259576 A1* | 9/2015 | Yutou ............. C08L 83/04 428/41.3 |
| 2015/0299532 A1 | 10/2015 | Myers |

FOREIGN PATENT DOCUMENTS

| | | | |
|---|---|---|---|
| EP | 1045759 | 10/2006 | |
| JP | H03-160085 A | 7/1991 | |
| JP | H04-57873 A | 2/1992 | |
| JP | H04-359961 A | 12/1992 | |
| JP | H05-101712 | 4/1993 | |
| JP | H07-062301 | 3/1995 | |
| JP | 2002-047460 | 2/2002 | |
| JP | 2010-258341 A | 11/2010 | |
| WO | WO 1997-007161 | 2/1997 | |
| WO | WO 1999-028128 | 6/1999 | |
| WO | WO 01/12436 A1 * | 2/2001 | ............ B32B 27/00 |
| WO | WO 2002-018507 | 3/2002 | |
| WO | WO 2014/179264 | 11/2014 | |

OTHER PUBLICATIONS

Pocius, Adhesion and Adhesive Technology—An Introduction, 229-238 (1997).

Search Report for RU Appl. No. 201935289, dated Apr. 29, 2019, 2 pp.

\* cited by examiner

ADHESIVE TAPES

CROSS REFERENCE TO RELATED APPLICATIONS

This application claims priority from U.S. Provisional Application Ser. No. 62/505408, filed May 12, 2017, the disclosure of which is incorporated by reference in its entirety herein.

BACKGROUND

Electrical tapes, as well as tapes and adhesive sheets for other applications which require stretching, typically use a polyvinylchloride (vinyl) substrate or backing, upon which the adhesive is coated. This material provides excellent mechanical properties such as elongation. Such vinyl materials are highly plasticized, with some containing up to 60 percent by weight (wt-%) plasticizers. Vinyl electrical tapes and sheets have traditionally been made by first applying a primer layer to a vinyl backing prior to the application of the adhesive. This primer provides the required anchorage of these two (in principle) incompatible layers. New and improved primers that provide better adhesion between the vinyl backing and the adhesive are needed.

SUMMARY OF THE INVENTION

The present disclosure provides adhesive tapes that include a plasticized polyvinyl chloride backing, an adhesive, and a primer layer disposed therebetween. Such combinations are particularly useful in electrical tapes.

In one embodiment, an adhesive tape is provided that includes: a backing comprising a plasticized polyvinyl chloride; a primer layer disposed on at least one major surface of the backing; and an adhesive layer (e.g., a pressure sensitive adhesive layer) disposed on the primer layer. In such tapes, the primer layer includes an ethylene/carbon monoxide-containing terpolymer. In certain embodiments, the ethylene/carbon monoxide-containing terpolymer of the primer layer includes a third monomer selected from vinyl acetate, n-butyl acrylate, and a combination thereof.

In certain embodiments, the ethylene/carbon monoxide-containing terpolymer is an ethylene/vinyl acetate/carbon monoxide (EVACO) terpolymer. In certain embodiments, the EVACO terpolymer includes: (a) 2.0 wt-% to 80 wt-% ethylene monomer; (b) 5 wt-% to 60 wt-% vinyl acetate monomer or n-butyl acrylate monomer (preferably, vinyl acetate monomer); and (c) 3 wt-% to 30 wt-% carbon monoxide monomer, wherein the percentages are based on the total weight of the terpolymer.

In certain embodiments, in addition to the ethylene/carbon monoxide-containing terpolymer, the primer further includes a second ethylene-containing copolymer or terpolymer. In certain embodiments, such ethylene-containing copolymer or terpolymers includes one or two monomers having a polarity greater than that of ethylene. In certain embodiments, the monomers having a polarity greater than that of ethylene are selected from acids, acetates, epoxies, acrylates, and combinations thereof.

In certain embodiments, in addition to the ethylene/carbon monoxide-containing terpolymer, the primer further includes a styrene-containing block copolymer, such as an ABA-block or AB-block type, where A is a hard thermoplastic block and B is a rubbery elastomeric block.

In certain embodiments, in addition to the ethylene/carbon monoxide-containing terpolymer, the primer further includes an epoxidized polymer, such as an epoxidized styrene-containing polymer or an epoxidized natural rubber.

The term "backing" refers to a film used to support the adhesive. The term "vinyl backing" refers to a film containing polyvinyl chloride.

The term "primer layer" refers to a layer that is disposed between the backing and an adhesive layer to enhance the anchorage of the adhesive to the backing.

The terms "polymer" and "polymeric material" include, but are not limited to, organic homopolymers, copolymers, such as for example, block (e.g., diblock, triblock), graft, random and alternating copolymers, and blends and modifications thereof. Furthermore, unless otherwise specifically limited, the term "polymer" shall include all possible geometrical configurations of the material. These configurations include, but are not limited to, isotactic, syndiotactic, and atactic symmetries. Furthermore, unless otherwise specifically limited, the term "copolymer" shall include polymers made of two or more different types of monomers, including terpolymers, tetrapolymers, etc.

Herein, the term "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and in certain situations, preferably, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein, the term "room temperature" refers to a temperature of 20° C. to 25° C. or 22° C. to 25° C.

Reference throughout this specification to "one embodiment," "an embodiment," "certain embodiments," or "some embodiments," etc., means that a particular feature, configuration, composition, or characteristic described in connection with the embodiment is included in at least one embodiment of the invention. Thus, the appearances of such phrases in various places throughout this specification are not necessarily referring to the same embodiment of the invention. Furthermore, the particular features, configurations, compositions, or characteristics may be combined in any suitable manner in one or more embodiments.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list.

BRIEF DESCRIPTION OF THE DRAWINGS

This FIGURE, which is idealized, is not to scale and is intended to be merely illustrative and nonlimiting.

DETAILED DESCRIPTION OF ILLUSTRATIVE EMBODIMENTS

The present disclosure provides adhesive tapes that include a plasticized polyvinyl chloride backing, an adhesive, and a primer layer disposed therebetween. Such combinations are particularly useful in electrical tapes (referred to generally as vinyl electrical tapes).

In one embodiment, an adhesive tape is provided that includes: a backing including a plasticized polyvinyl chloride; a primer layer disposed on at least one major surface of the backing; and an adhesive layer (e.g., a pressure sensitive adhesive layer) disposed on the primer layer. In such tapes, the primer layer includes an ethylene/carbon monoxide-containing terpolymer.

Figure 1:
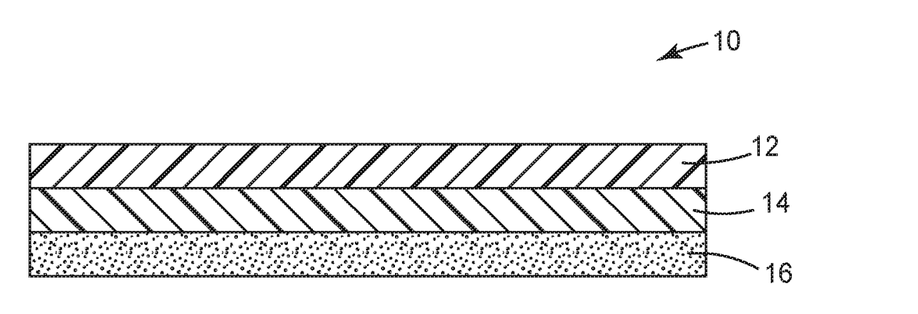
FIG. 1 is a cross section view of a tape according to one aspect of the invention.

For example, FIG. 1 is a cross section view of a tape 10 that includes a backing film 12, a primer layer 14 disposed on the backing film 12, and a pressure sensitive adhesive 16 disposed on the primer layer 14.

In certain embodiments, the backing has a total thickness of at least 1 mil (25.4 microns). In certain embodiments, the backing has a total thickness of up to 30 mils (762 microns).

In certain embodiments, the primer layer has a total thickness of at least 0.01 mil (0.254 micron). In certain embodiments, the primer layer has a total thickness of up to 6 mils (152.4 microns).

In certain embodiments, the adhesive layer has a total thickness of at least 0.2 mil (5.08 microns). In certain embodiments, the adhesive layer has a total thickness of up to 10 mils (254 microns).

In certain embodiments, tapes of the present disclosure demonstrate an adhesive backing anchorage of at least 35 Newtons per decimeter (N/dm) after heat aging at 65° C. for 48 hours.

Backings

Backings of the adhesive tapes of the present disclosure may have a total thickness of no more than 762 microns (30 mils), or no more than 635 microns (25 mils), or no more than 508 microns (20 mils), or no more than 381 microns (15 mils), or no more than 254 microns (10 mils). Such backings may include one or more layers.

The backings include polyvinyl chloride. In certain embodiments, the amount of polyvinyl chloride is more than 25 wt-%, or more than 30 wt-%, or more than 35 wt-%, or more than 40 wt-%, or more than 45 wt-%, or more than 50 wt-%, based on the total weight of the backing (or one layer in the backing).

The backings include plasticized polyvinyl chloride and optionally one or more fillers. The plasticized polyvinyl chloride may be selected from filled and unfilled grades of polyvinyl chloride resins, and said polyvinyl chloride resin having a K value of at least 50, or at least 60, or at least 70.

In certain embodiments, the plasticized polyvinyl chloride includes at least 10 wt-%, or at least 15 wt-%, or at least 20 wt-%, of one or more plasticizers, based on the total weight of the plasticized polyvinyl chloride. In certain embodiments, the plasticized polyvinyl chloride comprises up to 60 wt-%, or up to 50 wt-%, or up to 40 wt-%, of one or more plasticizers, based on the total weight of the plasticized polyvinyl chloride.

Exemplary plasticizers include an epoxidized vegetable oil, an epoxidized linseed oil, an epoxidized soybean oil, a mineral oil, an acetylated castor oil, a hydrogenated castor oil, an acetylated stearate ester, a furandicarboxylate, a dianhydrohexitol diester of 2-ethylheptanoic acid, a phthalate compound (such as diisononyl phthalate (DINP), diisodecyl phthalate (DIDP), and di-2-ethylhexyl phthalate (DEHP)), a terephthalate compound (such as dioctyl terephthalate), an adipate compound (such as di-2-ethylhexyl adipate (DEHA), di-isobutyl adipate (DMA), di-isodecyl adipate (DIDA), di-isononyl adipate (DINA), di-tridecyl adipate (DTDA)), a trimellitate (such as tris(2-ethylhexyl) trimellitate), diisooctyl phthalate (DOP), and a polymeric polyester-type plasticizer. Combinations of plasticizers may be used if desired.

Suitable fillers may be organic fillers, inorganic fillers, or combinations thereof.

Exemplary inorganic fillers include nepheline syenite, ceramic, glass, graphite, pigments (such as $TiO_2$ and boron nitride), oxides (such as zinc oxide, magnesium oxide, antimony trioxide, alumina trihydrate, silicon dioxide (i.e., silica)), hydroxides (such as aluminum hydroxide and magnesium hydroxide), inorganic salts (such as $CaCO_3$, $BaSO_4$, $CaSO_4$, phosphates, and hydrotalcite), silicates (such as talc, mica, kaolin, wollastonite, montmorillonite, diatomite, feldspar), or combinations thereof. In certain embodiments, the inorganic filler includes calcium carbonate.

Exemplary organic fillers include natural or synthetic polymer fillers, such as cellulose fibers, wood flour, wood fibers, flax, cotton, sisal, starch, recycled rubber crumb, recycled vinyl crumb, flakes, or pellets, or combinations thereof.

The fillers may include particulate of any of a variety of shapes (including fibers, spheres, beads, irregular particles) and sizes. In certain embodiments, the fillers include nano-sized particulate up to a size that is compatible with an extrusion process and not be so large that the particulate interferes with the film properties. In certain embodiments, the fillers include particulate having an average particle size (largest dimension of the particulate, e.g., diameter of spherical particles or length of fibers) of 1 micron to 50 microns.

In certain embodiments, the vinyl backing (or one layer of the backing) includes at least 0.01 wt-%, or at least 0.1 wt-%, or at least 1 wt-%, or at least 5 wt-%, or at least 10 wt-%, or at least 15 wt-%, or at least 20 wt-%, of one or more fillers, based on the total weight of the backing (or one layer of the backing).

In certain embodiments, the vinyl backing (or one layer of the backing) includes up to 80 wt-%, or up to 70 wt-%, or up to 60 wt-%, or up to 50 wt-%, or up to 40 wt-%, or up to 30 wt-%, of one or more fillers, based on the total weight of the backing (or one layer of the backing).

Optional additives may be used in the backings including, for example, colorants, processing aids, flame retardants, crosslinking agents, antioxidants, anti-smoke additives, and the like.

In certain embodiments, backings of the adhesive tapes of the present disclosure may be multilayer films. Such multilayer films may include at least 2, or at least 3, or at least 4, or at least 5 layers. In certain embodiments, multilayer films may include up to 15, or up to 14, or up to 13, or up to 12, or up to 11, or up to 10 layers. Such layers may be the same or different (e.g., same or different type and/or amount of filler, same or different type and/or amount of organic polymer, same or different type and/or amount of polyvinyl chloride, same or different type and/or amount of plasticizer).

Each layer of a multilayer film of the present disclosure may be the same or different with respect to thickness. In certain embodiments, each layer may have a thickness of at least 2.5 microns (0.1 mil). In certain embodiments, each layer may have a thickness of up to 250 microns (10 mils).

Varying the compositions of the various layers of a multilayer film provides advantages with respect to control of properties and performance, as well as cost. For example, lower cost materials can be used within the inner (core) layers. Also, properties such as cohesive strength, stiffness, cold flow, and tack, as well as chemical resistance and gas permeability may be varied and controlled by varying the compositions of the various layers of the multilayer film backings of the adhesive tapes of the present disclosure.

Multilayer film backings of the adhesive tapes of the present disclosure may include one or more organic polymers, wherein at least one layer includes a plasticized polyvinyl chloride. In certain embodiments, each layer of a multilayer film includes plasticized polyvinyl chloride (which may be the same or different). In certain embodiments, at least one layer includes one or more fillers. In certain embodiments, each layer includes one or more fillers. In certain embodiments, at least one layer includes plasticized polyvinyl chloride and one or more fillers.

The one or more organic polymers (other than plasticized polyvinyl chloride) may include a polyolefin (such as high-density polyethylene (HDPE), low-density polyethylene (LDPE), and polypropylene (PP)), a polyvinyl polymer (such as polyvinyl chloride (PVC) and polyvinyl acetate (PVA)), a polyolefin-based copolymer (such as ethylene-methacrylic acid copolymer (EEMA) and ethylene-vinyl acetate copolymer (EVA)), a block copolymer (such as acrylic block copolymers and styrene isoprene-vinyl acetate copolymer), a thermoplastic elastomer (TPE), or a combination thereof.

In certain embodiments, multilayer film backings of the adhesive tapes of the present disclosure include a core and two surface layers (i.e., skin layers). In certain embodiments, the core includes one or more layers.

In certain embodiments, at least one layer of the core includes one or more fillers. In certain embodiments, each surface layer includes one or more fillers. In certain embodiments, each surface layer is the same material. That is, in certain embodiments, each surface layer of a multilayer film includes the same composition (e.g., organic polymer, filler, additives).

In certain embodiments, the amount and/or type of filler in the core is different than the amount and/or type of filler in the surface layers.

Primers

Suitable primers for use in enhancing the adhesion of the adhesive to the backing include an ethylene/carbon monoxide-containing terpolymer, which is a solid-phase thermoplastic. Such polymers are hot-melt coatable. Thus, in certain embodiments, the primer is solventless. In certain embodiments, an ethylene/carbon monoxide-containing terpolymer is blended with another polymer.

In certain embodiments, the ethylene/carbon monoxide-containing terpolymer of the primer layer includes a third monomer selected from vinyl acetate, n-butyl acrylate, and a combination thereof. Surprisingly, such third monomers convert an ethylene/carbon monoxide copolymer from a release material (see, e.g., U.S. Pat. No. 5,232,786 (Waters et al.)) to a primer material that is used to enhance adhesion between two dissimilar materials. In certain embodiments, the ethylene/carbon monoxide-containing terpolymer is an ethylene/vinyl acetate/carbon monoxide (EVACO) terpolymer.

Ethylene/carbon monoxide-containing terpolymers are commercially available from such sources as DuPont of Wilmington, Del. under the tradename ELVALOY resin. Such resins are known additives for materials such as polyvinyl chloride polymers, which give long-lasting toughness and flexibility to materials such as highway pavement, roofing and geomembranes, plastic resins, underground pipe liners, and wire and cable jacketing. A key performance ingredient in such applications, ELVALOY resins often replaces liquid plasticizers or other lower-performing flexibilizers which can oxidize or migrate out of the material, leading to premature embrittlement.

In certain embodiments, the amount of the three monomers in an ethylene/carbon monoxide-containing terpolymer can include: (a) at least 20 wt-%, or at least 40 wt-%, or at least 65 wt-%, ethylene monomer; (b) at least 3 wt-%, or at least 4 wt-%, or at least 8 wt-%, carbon monoxide monomer; and (c) at least 5 wt-%, or at least 10 wt-%, or at least 20 wt-%, of a third monomer (preferably, vinyl acetate monomer or n-butyl acrylate monomer, and more preferably, vinyl acetate monomer), wherein the percentages are based on the total weight of the terpolymer.

In certain embodiments, the amount of the three monomers in an ethylene/carbon monoxide-containing terpolymer can include: (a) up to 80 wt-%, or up to 75 wt-%, ethylene monomer; (b) up to 30 wt-%, or up to 15 wt-%, or up to 10 wt-%, carbon monoxide monomer; and (c) up to 60 wt-%, or up to 40 wt-%, or up to 30 wt-%, of a third monomer (preferably, vinyl acetate monomer or n-butyl acrylate monomer, and more preferably, vinyl acetate monomer), wherein the percentages are based on the total weight of the terpolymer.

Various grades of ELVALOY ethylene/vinyl acetate/carbon monoxide resins are available, including for example, those available under the tradenames ELVALOY 741, 4924, and 742 from DuPont Co., Wilmington, Del. Various grades of ELVALOY ethylene/butyl acrylate/carbon monoxide resins are available, including for example, those available under the tradenames ELVALOY HP4051, HP661, HP662, and HP441 from DuPont Co., Wilmington, Del.

In certain embodiments, the ethylene/carbon monoxide-containing terpolymer is present in the primer in an amount of at least 25 wt-%, based on the total weight of the primer. In certain embodiments, the ethylene/carbon monoxide-containing terpolymer is present in the primer in an amount of up to 100 wt-%, based on the total weight of the primer.

A primer of the present disclosure may include a second ethylene-containing copolymer or terpolymer mixed with the ethylene/carbon monoxide-containing terpolymer. Such second ethylene-containing copolymer or terpolymer can include one or two comonomers that are more polar than ethylene. In certain situations, such second ethylene-containing copolymer or terpolymer can include one or two monomers that are nonpolar.

In certain embodiments, the ethylene-containing copolymer or terpolymer includes at least 40 wt-% ethylene, based on the total weight of the copolymer or terpolymer. In certain embodiments, the ethylene-containing copolymer or terpolymer includes up to 90 wt-% ethylene, based on the total weight of the copolymer or terpolymer.

Suitable monomers that are more polar than ethylene (for use in the ethylene-containing copolymer or terpolymer) are selected from acids, acetates, epoxies, acrylates, and combinations thereof. Examples of suitable such monomers that are more polar than ethylene include (C3-C20)unsaturated mono- and di-carboxylic acids and their esters; (C1-C15) vinyl esters of saturated carboxylic acids; vinyl(C1-C15) alkyl ethers; (C3-C12)alpha-olefins, and ring compounds such as norbornene, epoxies, and vinyl aromatic compounds.

In certain embodiments, the monomers that are more polar than ethylene include vinyl acetate, acrylic acid, methyl (meth)acrylate (i.e., methyl acrylates and methyl methacrylates), ethyl acrylate, glycidyl methacrylate, anhydride-functional monomers, n-butyl acrylate, and combinations thereof.

Alternatively or additionally, to having a monomer that is more polar than ethylene, a nonpolar monomer is also a potential comonomer in an ethylene-containing copolymer or terpolymer. Such nonpolar monomers include, for example, propylene, butene, hexene, octane, and combinations thereof.

In certain embodiments, the second ethylene-containing copolymer or terpolymer is an ethylene-containing terpolymer. In certain embodiments, the second ethylene-containing terpolymer includes ethylene, vinyl acetate or n-butyl acrylate (preferably, vinyl acetate), and a third monomer.

In certain embodiments, suitable such polymers include: (a) at least 40 wt-%, or at least 50 wt-%, or at least 65 wt-%, ethylene monomer; (b) at least 3 wt-%, or at least 5 wt-%, or at least 10 wt-%, or at least 20 wt-%, vinyl acetate or n-butyl acrylate monomer (preferably, vinyl acetate); and (c) at least 4 wt-%, or at least 8 wt-%, of a third monomer copolymerizable therewith, wherein the percentages are based on the total weight of the terpolymer.

In certain embodiments, suitable such polymers include: (a) up to 80 wt-%, or up to 75 wt-%, ethylene monomer; (b) up to 60 wt-%, or up to 40 wt-%, or up to 30 wt-%, or up to 24 wt-%, vinyl acetate or n-butyl acrylate monomer (preferably, vinyl acetate); and (c) up to 15 wt-%, or up to 10 wt-%, of a third monomer copolymerizable therewith, wherein the percentages are based on the total weight of the terpolymer.

In certain embodiments, the third monomer of the ethylene/vinyl acetate-containing terpolymer or ethylene/n-butyl acrylate-containing terpolymer is selected from epoxy-functional monomers, for example, glycidyl methacrylate. Various grades of such resins are available, including for example, those available under the tradenames ELVALOY 5160, 5170, 4170, and PTW, from DuPont Co., Wilmington, Del.

In certain embodiments, the second ethylene-containing copolymer or terpolymer is an ethylene-containing copolymer. In certain embodiments, the second ethylene-containing copolymer includes ethylene and a second monomer selected from vinyl acetate, acrylic acid, methyl (meth) acrylate (i.e., methyl acrylates and methyl methacrylates), ethyl acrylate, glycidyl methacrylate, anhydride-functional monomers, n-butyl acrylate, and combinations thereof. A nonpolar monomer is also a potential comonomer in an ethylene-containing copolymer. Such nonpolar monomers include, for example, propylene, butene, hexene, octane, and combinations thereof.

In certain embodiments, the ethylene-containing copolymer includes at least 10 wt-% comonomer other than ethylene, based on the total weight of the copolymer. In certain embodiments, the ethylene-containing copolymer includes up to 60 wt-% comonomer other than ethylene, based on the total weight of the copolymer.

In certain embodiments, the second ethylene-containing copolymer includes a mixture of ethylene-containing copolymers, at least a portion of which includes ethylene and a comonomer more polar than ethylene. Various grades of resins that include mixtures of ethylene-containing copolymers are available, including for example, those available under the tradename BYNEL 3101 from DuPont Co., Wilmington, Del.

In certain embodiments, the second ethylene-containing copolymer or terpolymer is present in the primer in an amount of at least 5 wt-%, or at least 14 wt-%, or at least 25 wt-%, based on the total weight of the primer. In certain embodiments, the second ethylene-containing copolymer or terpolymer is present in the primer in an amount of up to 95 wt-%, or up to 85 wt-%, or up to 75 wt-%, based on the total weight of the primer.

In certain embodiments, a primer of the present disclosure may include a styrene-containing block copolymer mixed with the ethylene/carbon monoxide-containing terpolymer. Suitable styrene-containing block copolymers are those of the ABA- or AB-block type, where A is a hard thermoplastic block and B is a rubbery elastomeric block. The block copolymers can be linear, branched, radial, and combinations thereof. Examples of suitable block copolymers include styrene-isoprene-styrene (SIS), styrene-butadiene-styrene (SBS), styrene-isoprene-butadiene-styrene (SIBS), styrene-ethylene-butadiene-styrene (SEBS), styrene-butadiene (SB), ethylene-propylene-diene, and hydrogenation products thereof.

Suitable commercially available block copolymers have a styrene content of at least 15 wt-%. Suitable commercially available block copolymers have a styrene content of up to 35 wt-%. Examples of styrene-containing block copolymers include those available under tradenames KRATON 1161, 1163, 1117, 1111, 1193, and 1171 from Kraton Corporation, Houston, Tex.

In certain embodiments, the styrene-containing block copolymer is present in the primer in an amount of at least 5 wt-%, or at least 15 wt-%, or at least 25 wt-%, based on the total weight of the primer. In certain embodiments, the styrene-containing block copolymer is present in the primer in an amount of up to 85 wt-%, or up to 75 wt-%, or up to 65 wt-%, or up to 50 wt-%, based on the total weight of the primer.

In certain embodiments, a primer of the present disclosure may include an epoxidized polymer mixed with the ethylene/carbon monoxide-containing terpolymer. In certain embodiments, the epoxidized polymer includes a concentration of epoxidized units of at least 0.5 wt-%, based on the total weight of the epoxidized polymer. In certain embodiments, the epoxidized polymer has a concentration of epoxidized units of at least 1 wt-%, or at least 2 wt-%, or at least 3 wt-%, or at least 4 wt-%, or at least 5 wt-%, based on the total weight of the epoxidized polymer. In certain embodiments, the epoxidized polymer has a concentration of epoxidized units of up to 10 wt-%, based on the total weight of the epoxidized polymer.

Examples of such epoxidized polymers include an epoxidized conjugated diene polymer, an epoxidized butadiene-containing copolymer, an epoxidized styrene-containing polymer (e.g., an epoxidized styrene-butadiene copolymer, and an epoxidized styrene-isoprene copolymer).

In certain embodiments, the epoxidized polymer includes an epoxidized styrene-containing polymer, such as an epoxidized styrene-butadiene copolymer, an epoxidized styrene-isoprene copolymer, or a combination thereof. In certain embodiments, the epoxidized polymer includes an epoxidized styrene-butadiene block copolymer. Epoxidized styrene-butadiene block copolymers are available under the tradename EPOFRIEND from Daicel Corporation (Fort Lee, N.J.).

In certain embodiments, the epoxidized polymer comprises an epoxidized natural rubber. Epoxidized natural rubbers are available under the tradename EPDXYPRENE (ENR25, ENR50) from MMG/Dynathai Co. Ltd. (Phuket, Thailand).

In certain embodiments, an epoxidized polymer is present in the primer in an amount of at least 1 wt-%, or at least 15 wt-%, based on the total weight of the primer. In certain embodiments, an epoxidized polymer is present in the primer in an amount of up to 99 wt-%, or up to 85 wt-%, based on the total weight of the primer.

A primer layer can be solvent coated onto one surface of the backing layer or coextruded with and formed on one side of the backing layer. Although in certain embodiments, the primer layer is solventless, it can include residual solvent, particularly if coated out of solvent.

Preferably, the primer is coated out of a solventless system (e.g., hot melt coated) due to environmental concerns (in contrast to most conventional primers).

Adhesives

The adhesive used in adhesive tapes of the present disclosure can be a pressure sensitive adhesive. It is not particularly restricted and may be any of a wide variety of known pressure sensitive adhesives. Pressure sensitive adhesives are a distinct category of adhesives and a distinct category of thermoplastics, which in dry (solvent-free) form are aggressively, and permanently, tacky at room temperature. They firmly adhere to a variety of dissimilar surfaces upon mere contact without the need of more than finger or hand pressure. Pressure sensitive adhesives require no activation by water, solvent, or heat to exert a strong adhesive holding force. They are sufficiently cohesive and elastic in nature so that, despite their aggressive tackiness, they can be handled with the fingers and removed from smooth surfaces without leaving a residue. Pressure sensitive adhesives can be quantitatively described using the "Dahlquist criteria" which maintains that the elastic modulus of these materials is less than $10^6$ dynes/cm$^2$ at room temperature (see, for example, Pocius, A. V., Adhesion & Adhesives: An Introduction, Hanser Publishers, New York, N.Y., First Edition, 1997).

Suitable pressure sensitive adhesives for use in the adhesive tapes of the present disclosure may be made via a wide variety of techniques. They may include an emulsion pressure sensitive adhesive, a solvent-borne pressure sensitive adhesive, a photo-polymerizable pressure sensitive adhesive, a hot melt pressure sensitive adhesive (i.e., hot melt extruded pressure sensitive adhesive), or a combination thereof.

Exemplary pressure sensitive adhesives include an acrylate-based pressure sensitive adhesive, a rubber-based pressure sensitive adhesive, a vinyl alkyl ether pressure sensitive adhesive, a silicone pressure sensitive adhesive, a polyester pressure sensitive adhesive, a polyamide pressure sensitive adhesive, a urethane pressure sensitive adhesive, a fluorinated pressure sensitive adhesive, an epoxy pressure sensitive adhesive, a block copolymer-based pressure sensitive adhesive, or a combination thereof.

In certain embodiments, the pressure sensitive adhesive (PSA) includes a rubber-based pressure sensitive adhesive. Rubber-based pressure sensitive adhesives typically include natural or synthetic rubber, a tackifying resin, an antioxidant, and other additives (e.g., fillers) as required. Exemplary rubber-based adhesive formulations are described in U.S. Pat. No. 5,500,293 (Lau et al), U.S. Pat. No. 6,432,530 (Garcia-Ramirez et al), and U.S. Pat. No. RE36,855 (Bredahl et al).

In certain embodiments, the rubber-based pressure sensitive adhesive includes a styrene-butadiene copolymer, a styrene-isoprene-styrene copolymer, a polyisoprene homopolymer, a polybutadiene homopolymer, or a combination thereof.

In certain embodiments, the rubber-based pressure sensitive adhesive comprises a polyisoprene homopolymer.

In certain embodiments, the rubber-based pressure sensitive adhesive includes a mixture or blend of polyisoprene homopolymer and a styrene-isoprene-styrene copolymer. In certain embodiments, the rubber-based pressure sensitive adhesive includes at least 13 wt-% of a polyisoprene homopolymer, based on the total weight of the pressure sensitive adhesive. In certain embodiments, the rubber-based pressure sensitive adhesive includes up to 42 wt-% of a polyisoprene homopolymer, based on the total weight of the pressure sensitive adhesive. In certain embodiments, the rubber-based pressure sensitive adhesive includes at least 13 wt-% of a styrene-isoprene-styrene copolymer, based on the total weight of the pressure sensitive adhesive.

In certain embodiments, the rubber-based pressure sensitive adhesive includes up to 42 wt-% of a styrene-isoprene-styrene copolymer, based on the total weight of the pressure sensitive adhesive.

In certain embodiments, the rubber-based pressure sensitive adhesive further includes an end-block reinforcing resin. Certain adhesive compositions may contain at least 2 wt-%, or at least 5 wt-%, of an end-block reinforcing resin, based on the total weight of the adhesive composition. Certain adhesive compositions may contain up to 20 wt-%, or up to 15 wt-%, of an end-block reinforcing resin, based on the total weight of the adhesive composition. The reinforcing end-block resin may be an aromatic, essentially hydrocarbon resin, which generally has a glass transition temperature higher than that of the adhesive application temperature.

Useful resins include low molecular weight oligomers and polymers of styrene and α-methylstyrene and p-methylstyrene, and copolymers thereof. Examples include those commercially available under the tradenames ENDEX 155 and 160, KRISTALEX 5140 and 1120, from Eastman Chemical Company (Kingsport, Tenn.).

In certain embodiments, the rubber-based pressure sensitive adhesive further includes a solid tackifying agent. Examples of solid tackifying agents (i.e., tackifying resins) include aliphatic resins (e.g., C5 resins), aromatic resins (e.g., C9 resins), terpene-based resins, and rosin resins (e.g., rosin esters, hydrogenated rosin resins, and dimerized rosin resins which can be obtained, for example, from Eastman (Kingsport, Tenn.)). If used, one or more tackifying agents can be used in an amount of at least 25 wt-%, or at least 30 wt-%, based on the total weight of the adhesive composition. If used, one or more tackifying agents can be used in an amount of up to 55 wt-%, or up to 45 wt-%, based on the total weight of the adhesive composition.

In certain embodiments, the rubber-based pressure sensitive adhesive further includes a multifunctional crosslinking agent (particularly a (meth)acrylate crosslinking agent). Examples of multifunctional crosslinking agents include butanediol diacrylate, hexanediol diacrylate, divinylbenzene, and other latent crosslinking agents such as reactive phenolics. If used, one or more crosslinking agents can be used in an amount of at least 0.5 wt-%, or at least 1 wt-%, based on the total weight of the adhesive composition. If used, one or more crosslinking agents can be used in an amount of up to 10 wt-%, or up to 5 wt-%, based on the total weight of the adhesive composition.

In certain embodiments, the pressure sensitive adhesive includes (PSA) includes an acrylate-based pressure sensitive adhesive.

Typically, an acrylate-based pressure sensitive adhesive includes at least one polymerized monofunctional unsaturated monomer and at least one non-acidic comonomer and/or at least one acidic comonomer.

In certain embodiments, at least one monofunctional unsaturated monomer is selected from the group of (meth) acrylate esters of non-tertiary alkyl alcohols, the alkyl groups of which preferably comprise from 4 to 12, more preferably 4 to 8 carbon atoms; and mixtures thereof. Preferred (meth)acrylate monomers have the following general Formula (I):

Formula (I)

wherein $R^1$ is H or $CH_3$, the latter corresponding to where the (meth)acrylate monomer is a methacrylate monomer; $R^2$ is broadly selected from linear or branched hydrocarbon groups and may contain one or more heteroatoms, and the number of carbon atoms in the hydrocarbon group is preferably 4 to 12, and more preferably 4 to 8.

Illustrative examples of (meth)acrylate monomers useful in the present invention include n-butyl acrylate, decyl acrylate, 2-ethylhexyl acrylate, hexyl acrylate, isoamyl acrylate, isodecyl acrylate, isononyl acrylate, isooctyl acrylate, lauryl acrylate, 2-methyl butyl acrylate, 4-methyl-2-pentyl acrylate, ethoxy ethoxyethyl acrylate, isobornyl methacrylate, glycidyl methacrylate, and 2-octyl acrylate. Also suitable are monomers comprising structural isomers of a secondary alkyl (meth)acrylate and mixtures thereof, as described in U.S. Patent Application Publication No. 2013/0260149 (Clapper et al.). Particularly preferred are n-butyl acrylate, 2-ethylhexyl acrylate, isooctyl acrylate, lauryl acrylate, and mixtures thereof.

In certain embodiments, the non-acidic comonomer includes, but is not limited to, N,N-dimethyl acrylamide, N,N-diethyl acrylamide, tert-octyl acrylamide, N,N-dimethyl methacrylamide, N,N-diethyl methacrylamide, n-octyl acrylamide, and mixtures thereof.

In certain embodiments, the acidic co-monomer includes, but is not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, beta-carboxyethyl acrylate, 2-sulfoethyl methacrylate, styrene sulfonic acid, 2-acrylamido-2-methylpropane sulfonic acid, vinyl phosphonic acid, and the like, and mixtures thereof. Due to their availability and effectiveness in reinforcing (meth)acrylate pressure sensitive adhesives, particularly preferred acidic monomers are the ethylenically unsaturated carboxylic acids.

Minor amounts of monomers copolymerizable with the (meth)acrylate monomers and acidic monomers can be used. Examples of such monomers include (meth)acrylamides, vinyl esters, and N-vinyl lactams.

A copolymerizable mixture of acrylic monomers typically includes, based upon 100 parts by weight total, about 90 to 99 parts by weight of one or more (meth)acrylate ester monomers and about 1 to 10 parts by weight one or more acidic or non-acidic monomers. The (meth)acrylate ester monomers, that when polymerized in the absence of other comonomers yield a polymer or copolymer having a $T_g$ of less than about 10° C.

The ratio and type of each co-monomer in the acrylate-based adhesive composition can be chosen within the stated limits to optimize the performance. Optionally, a reactive agent that will function as a plasticizer to lower adhesive $T_g$ and modulus may be used. An ethylene oxide acrylate monomer acts as a plasticizer that can be incorporated into the polymer backbone. Polyalkyl glycol acrylate will also function to reduce $T_g$ of polymer backbone and reduce $T_g$ and modulus. An example is: MPE-550A Methoxypolyethyleneglycol acrylate (Osaka organic chemical industry):

$n = 9$

A free radical initiator is optionally added to aid in the copolymerization of (meth)acrylate comonomers and acidic comonomers. The type of initiator used depends on the polymerization process. Photoinitiators which are useful for polymerizing the polymerizable mixture monomers include benzoin ethers such as benzoin methyl ether or benzoin isopropyl ether, substituted benzoin ethers such as 2-methyl-2-hydroxypropiophenone, aromatic sulfonyl chlorides such as 2-naphthalenesulfonyl chloride, and photoactive oxides such as 1-phenyl-1,1-propanedione-2-(o-ethoxycarbonyl) oxime. An example of a commercially available photoinitiator suitable for use in many embodiments is IRGACURE 651 (2,2-dimethoxy-1,2-diphenylethane-1-one, from Ciba-Geigy Corporation). Generally, the photoinitiator is present in an amount of about 0.005 to about 1 weight percent based on the weight of the copolymerizable monomers. Examples of suitable thermal initiators include AIBN (i.e., 2,2'-azobis (isobutyronitrile), hydroperoxides, such as tert-butyl hydroperoxide, and peroxides, such as benzoyl peroxide and cyclohexane peroxide.

Optionally, a copolymerizable mixture of (meth)acrylic monomers (i.e., acrylic monomers and methacrylic monomers) may also include a chain transfer agent to control the molecular weight of the polymerized compositions. Chain transfer agents are materials that regulate free radical polymerization and are generally known in the art. Suitable chain transfer agents include halogenated hydrocarbons such as carbon tetrabromide; sulfur compounds such as lauryl mercaptan, butyl mercaptan, ethanethiol, isooctylthioglycolate (IOTG), 2-ethylhexyl thioglycolate, 2-ethylhexyl mercaptopropionate, 2-mercaptoimidazole, and 2-mercaptoethyl ether and mixtures thereof.

The amount of chain transfer agent that is useful depends upon the desired molecular weight and the type of chain transfer agent. The chain transfer agent is typically used in amounts from about 0 part to about 10 parts by weight per 100 parts of total monomer, and preferably from about 0 part to about 0.5 part.

A copolymerizable mixture of (meth)acrylic monomers may be polymerized using a solventless method. Solventless polymerization methods, such as the continuous free radical polymerization method described in U.S. Pat. No. 4,619,979 (Kotnour et al.) and U.S. Pat. No. 4,843,134 (Kotnour et al.); the essentially adiabatic polymerization methods using a batch reactor described in U.S. Pat. No. 5,637,646 (Ellis); and, the methods described for polymerizing packaged polymerizable mixtures described in U.S. Pat. No. 5,804,610 (Hamer et al.) may also be utilized to prepare an acrylate-based pressure sensitive adhesive.

In one preferred embodiment of this latter method, from about 0.1 to about 500 g of the polymerizable mixture including the (meth)acrylate monomers, acidic or non-acidic monomers, and optional chain transfer agent is completely surrounded by a packaging material. In another preferred embodiment, from about 3 to about 100 g of the polymerizable mixture is surrounded by the packaging material. In another embodiment of the invention, the polymerizable mixture is substantially surrounded by the packaging material. In yet another embodiment, the polymerizable mixture is disposed on the surface of a sheet, or between a pair of two substantially parallel sheets of the packaging material. In another embodiment, the polymerizable mixture is substantially or completely surrounded by a hollow profile of packaging material with a length:square root of the cross-sectional area ratio of at least about 30:1.

The packaging material is made of a material that when combined with the adhesive does not substantially adversely affect the desired adhesive characteristics. A hot melt coated adhesive produced from a mixture of the adhesive and the packaging material may have improved adhesive properties compared to hot melt coated adhesive produced from adhesive alone.

The packaging material preferably melts at or below the processing temperature of the adhesive (i.e., the temperature at which the adhesive flows, or the flow temperature). The packaging material preferably has a melting point, or melting temperature, of about 200° C. or less, preferably about 170° C. or less. In a preferred embodiment, the melting point ranges from about 90° C. to about 150° C. The packaging material may be a flexible thermoplastic polymeric film. The packaging material is preferably selected from ethylene-vinyl acetate, ethylene-acrylic acid, polypropylene, polyethylene, polybutadiene, or ionomeric films. In a preferred embodiment the packaging material is an ethylene-acrylic acid or ethylene-vinyl acetate film.

The amount of packaging material depends upon the type of material and the desired end properties. The amount of packaging material typically ranges from about 0.5 percent to about 20 percent of the total weight of the polymerization mixture and the packaging material. Preferably, the packaging material is from about 2 percent to about 15 percent by weight, and more preferably from about 3 percent to about 5 percent. Such packaging materials may contain plasticizers, stabilizers, dyes, perfumes, fillers, slip agents, antiblock agents, flame retardants, anti-static agents, microwave receptors, thermally conductive particles, electrically conductive particles, and/or other materials to increase the flexibility, handleability, visibility, or other useful property of the film, as long as they do not adversely affect the desired properties of the adhesive.

The packaging material should be appropriate for the polymerization method used. For example, with photopolymerization, it is necessary to use a film material that is sufficiently transparent to ultraviolet radiation at the wavelengths necessary to effect polymerization.

The transmissive energy may be selected from ultraviolet radiation, visible radiation, thermal radiation, or thermal conduction. The transmissive energy is preferably ultraviolet radiation or thermal conduction. Preferably, at least about 80 percent of the pre-adhesive is converted to adhesive; more preferably, at least about 90 percent of the pre-adhesive is converted to adhesive.

Thermal polymerization can be effected by immersing the packaged composition in a heat exchange medium at temperatures from about 40° C. to about 100° C. for a time sufficient to polymerize the composition. The heat exchange medium may be a forced or impinged gas or a liquid such as water, perfluorinated liquids, glycerin, or propylene glycol. The heat necessary for thermal polymerization may also be provided by a metal platen, heated metal rolls, or microwave energy.

The temperature at which the polymerization of a copolymerizable mixture of acrylic monomers occurs depends upon the activation temperature of the initiator. For example, polymerization using VAZO 64, a commercially available initiator from DuPont Company can be carried out at about 65° C., while VAZO 52, also from DuPont Company, can be used at about 45° C.

It is preferable to carry out the polymerization of a copolymerizable mixture of acrylic monomers in an appropriate liquid heat exchange medium at a controlled temperature. A suitable liquid heat exchange medium is water, heated to the desired reaction temperature. Commercially available heat transfer fluids may also be used.

Polymerization can also be effected by exposure to ultraviolet (UV) radiation as described in U.S. Pat. No. 4,181,752 (Martens et al.). In a preferred embodiment, the polymerization is carried out with UV black lights having over 60 percent, and preferably over 75 percent of their emission spectra from about 280 to about 400 nm, with an intensity from about 0.1 to about 25 mW/cm$^2$.

During photopolymerization it is desirable to control the temperature by blowing cooling air around the packaged polymerizable mixture, by running the packaged polymerizable mixture over a cooled platen, or by immersing the packaged polymerizable mixture in a water bath or a heat transfer fluid during polymerization. Preferably, the packaged polymerizable mixtures are immersed in a water bath, with water temperatures from about 5° C. to 90° C., preferably below about 30° C. Agitation of the water or fluid helps to avoid hot spots during the reaction.

The packaged polymerized adhesive compositions may be used to make a coatable hot melt adhesive by introducing the adhesive and its packaging material into a vessel in which the adhesive and its packaging material are melted. This hot melt adhesive may be used to form a pressure sensitive adhesive sheet by coating the melted adhesive and its packaging material onto a sheet material or another suitable substrate. The sheet material is preferably selected from a tape backing or a release liner. Preferably, the polymerized adhesives are hot melt coated by putting the packaged adhesive in a hot melt coater at a temperature sufficient to melt the packaged adhesive and with sufficient mixing to form a coatable mixture, which is coated onto a substrate. This step can be done conveniently in a heated extruder, bulk tank melter, melt-on-demand equipment, or a hand-held hot melt adhesive gun.

For any of these embodiments, the coatable hot melt adhesive can then be delivered out of a film die, subsequently contacting the drawn adhesive to a moving plastic web or other suitable substrate. A related coating method involves extruding the coatable hot melt adhesive and a coextruded backing material from a film die and cooling the layered product to form an adhesive tape. Other forming methods involve directly contacting the coatable hot melt adhesive to a rapidly moving plastic web or other suitable preformed substrate. Using this method, the adhesive blend is applied to the moving preformed web using a die having flexible die lips, such as a rotary rod die. After forming by any of these continuous methods, the adhesive films or layers can be solidified by quenching using both direct methods (e.g., chill rolls or water baths) and indirect methods (e.g., air or gas impingement).

The packaged acrylic adhesive composition may further include an effective amount of a crosslinking agent that may be activated after the adhesive has been hot melt coated. Typically, the amount ranges from about 0.01 to about 5.0 parts based upon 100 parts of the (meth)acrylate monomers and the acidic comonomers. The crosslinking agent can be added to the polymerized adhesive before or during hot melt coating, or it can be added to the polymerizable mixture. When added to the polymerizable mixture, the crosslinking agent can remain intact as a separate species in the adhesive, or it can be co-polymerized with the monomers. Crosslinking is preferably initiated after hot melt coating, and the crosslinking is preferably initiated by ultraviolet radiation, or ionizing radiation such as gamma radiation or electron beam (the use of separate crosslinking agents being optional in the case of ionizing radiation). Preferred crosslinking agents that can be added after polymerization and before hot melt coating include multi-functional (meth)acrylates such as 1,6-hexanedioldiacrylate and trimethylolpropane triacrylate, and substituted triazines such as 2,4-bis(trichloromethyl)-6-(4-methoxyphenyl)-s-triazine and 2,4-bis(trichloromethyl)-6-(3,4-dimethoxyphenyl)-s-triazine, as described in U.S. Pat. No. 4,329,384 (Vesley et al.) and U.S. Pat. No. 4,330,590 (Vesley). Another class of preferred crosslinking agents are the copolymerizable mono-ethylenically unsaturated aromatic ketone comonomers free of ortho-aromatic hydroxyl groups such as those disclosed in U.S. Pat. No. 4,737,559 (Kellen et al.). Specific examples include para-acryloxybenzophenone, para-acryloxyethoxybenzophenone, para-N-(methylacryloxyethyl)-carbamoylethoxybenzophenone, para-acryloxyacetophenone, ortho-acrylamidoacetophenone, acrylated anthraquinones, and the like.

Yet another class of suitable crosslinking agents for use in an acrylate-based pressure sensitive adhesive are the multifunctional radiation-activatable crosslinking agents described in PCT Patent Application WO 97/07161 (Stark et al.), and in U.S. Pat. No. 5,407,971 (Everaerts et al.). An example of these crosslinking agents is 1,5-bis(4-benzoylbenzoxy) pentane. Also suitable are hydrogen-abstracting carbonyls such as anthraquinone, benzophenone, and derivatives thereof, as disclosed in U.S. Pat. No. 4,181,752 (Clemens et al.).

The acrylate copolymers in a copolymerizable mixture of acrylic monomers can be crosslinked by exposure to ultraviolet radiation from, for example, medium pressure mercury arc lamps. It is preferred that crosslinking agents activated by ultraviolet radiation be primarily activated by a different wavelength of energy than that used for the polymerization. For example, low intensity black lights may be used for polymerization and mercury arc lamps may be used for the subsequent crosslinking.

The steps may be done in-line, that is, the polymerizable mixture may be surrounded by the packaging material, polymerized, hot melt coated to form a tape, and optionally crosslinked, or the steps may be performed individually at separate times and sites. For example, the packaged prepolymeric mixture may be polymerized at one time, and extruded and crosslinked at another time (if cross-linking is desired).

Optionally, the adhesives (e.g., acrylate-based, rubber-based, etc.) may include tackifiers, plasticizers, fillers or other additives known in the art to further optimize adhesive performance. For example, in certain embodiments, pressure sensitive adhesives of the disclosure include one or more fillers. Suitable fillers for use in pressure sensitive adhesives of the present disclosure may be organic fillers, inorganic fillers, or combinations thereof.

Exemplary inorganic fillers include nepheline syenite, ceramic, glass, graphite, pigments (such as $TiO_2$ and boron nitride), oxides (such as zinc oxide, magnesium oxide, antimony trioxide, alumina trihydrate, silicone dioxide (i.e., silica)), hydroxides (such as aluminum hydroxide and magnesium hydroxide), inorganic salts (such as $CaCO_3$, $BaSO_4$, $CaSO_4$, phosphates, and hydrotalcite), silicates (such as talc, mica, kaolin, wollastonite, montmorillonite, diatomite, feldspar), or combinations thereof. In certain embodiments, the inorganic filler includes calcium carbonate.

Exemplary organic fillers include natural or synthetic polymer fillers, such as cellulose fibers, wood flour, wood fibers, flax, cotton, sisal, starch, recycled rubber crumb, recycled vinyl crumb, flakes, or pellets, or combinations thereof.

The fillers may include particulate of any of a variety of shapes (including fibers, spheres, beads, irregular particles) and sizes. In certain embodiments, the fillers include nano-sized particulate up to a size that is compatible with adhesive processing. In certain embodiments, the fillers include particulate having an average particle size (largest dimension of the particulate, e.g., diameter of spherical particles or length of fibers) of 1 micron to 50 microns.

In certain embodiments, an adhesive layer includes at least 0.01 wt-%, or at least 0.1 wt-%, or at least 1 wt-%, or at least 5 wt-%, or at least 10 wt-%, or at least 15 wt-%, or at least 20 wt-%, of one or more fillers, based on the total weight of the adhesive composition.

In certain embodiments, an adhesive layer includes up to 80 wt-%, or up to 70 wt-%, or up to 60 wt-%, or up to 50 wt-%, or up to 40 wt-%, or up to 30 wt-%, of one or more fillers, based on the total weight of the adhesive composition.

Methods

As would be understood by one of ordinary skill in the art given the present description, the tapes described herein can be formed using any number of well-known processes/techniques. Exemplary well-known processes/techniques are described in U.S. Pat. No. 4,713,273 (Freedman), U.S. Pat. No. 5,407,970 (Peterson et al.), U.S. Pat. No. 5,804,610 (Hamer et al), U.S. Pat. No. 6,040,027 (Freedman), U.S. Pat. No. 8,980,967 (Krepski et al.), and U.S. Pat. No. 9,238,702 (Fornof et al.), U.S. Patent Publication Nos. 2013/0184393 (Satrijo et al.) and 2015/299532 (Myers et al.), and European Patent No. EP0352901 (Everaerts et al.).

Exemplary Embodiments

Embodiment 1 is an adhesive tape comprising: a backing comprising a plasticized polyvinyl chloride; a primer layer disposed on at least one major surface of the backing, wherein the primer comprises an ethylene/carbon monoxide-containing terpolymer; and an adhesive (e.g., a pressure sensitive adhesive) layer disposed on the primer layer.

Embodiment 2 is the adhesive tape of embodiment 1 wherein the primer is solventless.

Embodiment 3 is the adhesive tape of embodiment 1 or 2 wherein the ethylene/carbon monoxide-containing terpolymer comprises a third monomer selected from vinyl acetate, n-butyl acrylate, and a combination thereof.

Embodiment 4 is the adhesive tape of any one of embodiments 1 to 3 wherein the ethylene-containing terpolymer comprises: (a) 20 wt-% to 80 wt-% ethylene monomer; (b) 3 wt-% to 30 wt-% carbon monoxide monomer; and (c) 5 wt-% to 60 wt-% of a third monomer, wherein the percentages are based on the total weight of the terpolymer.

Embodiment 5 is the adhesive tape of embodiment 3 or 4 wherein the third monomer is vinyl acetate.

Embodiment 6 is the adhesive tape of embodiment 3 or 4 wherein the third monomer is n-butyl acrylate.

Embodiment 7 is the adhesive tape of any one of embodiments 1 to 6 wherein the primer further comprises a second ethylene-containing copolymer or terpolymer.

Embodiment 8 is the adhesive tape of embodiment 7 wherein the ethylene is present in the second ethylene-containing copolymer or terpolymer in an amount of 40 wt-% to 90 wt-%, based on the total weight of the copolymer or terpolymer.

Embodiment 9 is the adhesive tape of embodiment 7 or 8 wherein the second ethylene-containing copolymer or terpolymer comprises one or two comonomers having a polarity greater than that of ethylene.

Embodiment 10 is the adhesive tape of embodiment 9 wherein the comonomers having a greater polarity than that of ethylene are selected from acids, acetates, epoxies, acrylates, and combinations thereof.

Embodiment 11 is the adhesive tape of embodiment 10 wherein the comonomers having a greater polarity than that of ethylene are selected from vinyl acetate, acrylic acid, methyl (meth)acrylate, ethyl acrylate, glycidyl methacrylate, anhydride-functional monomers, n-butyl acrylate, and combinations thereof.

Embodiment 12 is the adhesive tape of any one of embodiments 6 to 11 wherein the second ethylene-containing copolymer or terpolymer comprises an ethylene-containing terpolymer.

Embodiment 13 is the adhesive tape of embodiment 12 wherein the second ethylene-containing terpolymer comprises ethylene, vinyl acetate or n-butyl acrylate (preferably, vinyl acetate), and a third monomer.

Embodiment 14 is the adhesive tape of embodiment 13 wherein the ethylene/vinyl acetate-containing terpolymer comprises: (a) 40 wt-% to 80 wt-% ethylene monomer; (b) 3 wt-% to 60 wt-% vinyl acetate monomer; and (c) 4 wt-% to 15 wt-% of a third monomer, wherein the percentages are based on the total weight of the terpolymer.

Embodiment 15 is the adhesive tape of any one of embodiments 6 to 11 wherein the second ethylene-containing copolymer or terpolymer comprises an ethylene-containing copolymer.

Embodiment 16 is the adhesive tape of embodiment 15 wherein the second ethylene-containing copolymer comprises ethylene and a second monomer selected from vinyl acetate, acrylic acid, methyl (meth)acrylate, ethyl acrylate, glycidyl methacrylate, anhydride-functional monomers, n-butyl acrylate, and combinations thereof.

Embodiment 17 is the adhesive tape of any one of embodiments 6 to 16 wherein the second ethylene-containing copolymer or terpolymer is present in the primer in an amount of 5 wt-% to 95 wt-%, based on the total weight of the primer.

Embodiment 18 is the adhesive tape of embodiment 17 wherein the second ethylene-containing copolymer or terpolymer is present in the primer in an amount of 14 wt-% to 85 wt-%, based on the total weight of the primer.

Embodiment 19 is the adhesive tape of embodiment 18 wherein the second ethylene-containing copolymer or terpolymer is present in the primer in an amount of 25 wt-% to 75 wt-%, based on the total weight of the primer.

Embodiment 20 is the adhesive tape of any one of embodiments 1 to 19 wherein the primer further comprises a styrene-containing block copolymer.

Embodiment 21 is the adhesive tape of embodiment 20 wherein the styrene-containing block copolymer comprises an ABA-block or AB-block type, where A is a hard thermoplastic block and B is a rubbery elastomeric block.

Embodiment 22 is the adhesive tape of embodiment 21 wherein the styrene-containing block copolymer comprises styrene-isoprene-styrene (SIS), styrene-butadiene-styrene (SBS), styrene-isoprene-butadiene-styrene (SIBS), styrene-ethylene-butadiene-styrene (SEBS), styrene-butadiene (SB), ethylene-propylene-diene, or hydrogenation products thereof.

Embodiment 23 is the adhesive tape of any one of embodiments 20 to 22 wherein the styrene-containing block copolymer is present in the primer in an amount of 5 wt-% to 85 wt-%, based on the total weight of the primer.

Embodiment 24 is the adhesive tape of embodiment 23 wherein the styrene-containing block copolymer is present in the primer in an amount of 25 wt-% to 75 wt-%, based on the total weight of the primer.

Embodiment 25 is the adhesive tape of any one of embodiments 1 to 24 wherein the primer further comprises an epoxidized polymer.

Embodiment 26 is the adhesive tape of embodiment 25 wherein the epoxidized polymer comprises a concentration of epoxidized units of at least 0.5 wt-%, based on the total weight of the epoxidized polymer.

Embodiment 27 is the adhesive tape of embodiment 25 or 26 wherein the epoxidized polymer has a concentration of epoxidized units of up to 10 wt-%, based on the total weight of the epoxidized polymer.

Embodiment 28 is the adhesive tape of any one of embodiments 25 to 27 wherein the epoxidized polymer comprises an epoxidized styrene-containing polymer.

Embodiment 29 is the adhesive tape of embodiment 28 wherein the epoxidized styrene-containing polymer comprises an epoxidized styrene-butadiene copolymer, an epoxidized styrene-isoprene polymer, or a combination thereof.

Embodiment 30 is the adhesive tape of embodiment 29 wherein the epoxidized polymer comprises an epoxidized styrene-butadiene block copolymer.

Embodiment 31 is the adhesive tape of any one of embodiments 25 to 27 wherein the epoxidized polymer comprises an epoxidized natural rubber.

Embodiment 32 is the adhesive tape of any one of embodiments 25 to 31 wherein the epoxidized polymer is present in the primer in an amount of 1 wt-% to 99 wt-%, based on the total weight of the primer.

Embodiment 33 is the adhesive tape of embodiment 32 wherein the epoxidized polymer is present in the primer in an amount of 15 wt-% to 85 wt-%, based on the total weight of the primer.

Embodiment 34 is the adhesive tape of any one of embodiments 1 to 33 wherein the ethylene/carbon monoxide-containing polymer is present in the primer in an amount of 25 wt-% to 100 wt-%, based on the total weight of the primer.

Embodiment 35 is the adhesive tape of any one of embodiments 1 to 34 wherein the backing comprises one or more fillers.

Embodiment 36 is the adhesive tape of embodiment 35 wherein the one or more fillers comprise an inorganic filler.

Embodiment 37 is the adhesive tape of embodiment 36 wherein the inorganic filler comprises nepheline syenite, ceramic, glass, graphite, pigments, oxides, hydroxides, inorganic salts, silicates, or combinations thereof.

Embodiment 38 is the adhesive tape of any one of embodiments 35 to 37 wherein the one or more fillers comprise an organic filler.

Embodiment 39 is the adhesive tape of embodiment 38 wherein the organic filler comprises cellulose fibers, wood flour, wood fibers, flax, cotton, sisal, starch, recycled rubber crumb, recycled vinyl crumb, flakes, or pellets, or combinations thereof.

Embodiment 40 is the adhesive tape of any one of embodiments 35 to 39 wherein the one or more fillers comprise particulate comprising nano-sized particulate.

Embodiment 41 is the adhesive tape of embodiment 40 wherein the particulate has an average particle size of 1 micron to 50 microns.

Embodiment 42 is the adhesive tape of any one of embodiments 1 to 41 wherein the plasticized polyvinyl chloride backing comprises 10 wt-% to 60 wt-% of one or more plasticizers, based on the total weight of the plasticized polyvinyl chloride.

Embodiment 43 is the adhesive tape of embodiment 42 wherein the plasticized polyvinyl chloride comprises one or more plasticizers selected from the group of an epoxidixed vegetable oil, an epoxidized soybean oil, an epoxidized linseed oil, a mineral oil, an acetylated castor oil, a hydrogenated castor oil, an acetylated stearate ester, a furandicarboxylate, a dianhydrohexitol diester of 2-ethylheptanoic acid, a phthalate compound (such as diisononyl phthalate (DINP), diisodecyl phthalate (DIDP), and di-2-ethylhexyl phthalate (DEHP)), a terephthalate compound (such as dioctyl terephthalate), an adipate compound (such as di-2-ethylhexyl adipate (DEHA), di-isobutyl adipate (DMA), di-isodecyl adipate (DIDA), di-isononyl adipate (DINA), di-tridecyl adipate (DTDA)), a trimellitate (such as tris(2-ethylhexyl) trimellitate), diisooctyl phthalate (DOP), a polymeric polyester-type plasticizer, and a combination thereof.

Embodiment 44 is the adhesive tape of any one of embodiments 1 to 43 wherein the adhesive is a pressure sensitive adhesive comprising an emulsion pressure sensitive adhesive, a solvent-borne pressure sensitive adhesive, a photo-polymerizable pressure sensitive adhesive, a hot melt pressure sensitive adhesive (i.e., hot melt extruded pressure sensitive adhesive), or a combination thereof.

Embodiment 45 is the adhesive tape of embodiment 44 wherein the pressure sensitive adhesive comprises a rubber-based pressure sensitive adhesive.

Embodiment 46 is the adhesive tape of embodiment 45 wherein the rubber-based pressure sensitive adhesive comprises a styrene-butadiene copolymer, a styrene-isoprene-styrene copolymer, a polyisoprene homopolymer, a polybutadiene homopolymer, or a combination thereof.

Embodiment 47 is the adhesive tape of embodiment 46 wherein the rubber-based pressure sensitive adhesive comprises a polyisoprene homopolymer.

Embodiment 48 is the adhesive tape of embodiment 47 wherein the rubber-based pressure sensitive adhesive comprises a polyisoprene homopolymer and a styrene-isoprene-styrene copolymer.

Embodiment 49 is the adhesive tape of embodiment 47 or 48 wherein the rubber-based pressure sensitive adhesive comprises 13 wt-% to 42 wt-% of a polyisoprene homopolymer or a styrene-isoprene-styrene copolymer, based on the total weight of the pressure sensitive adhesive.

Embodiment 50 is the adhesive tape of any one of embodiments 45 to 49 wherein the rubber-based pressure sensitive adhesive further comprises an end-block reinforcing resin.

Embodiment 51 is the adhesive tape of any one of embodiments 45 to 50 wherein the rubber-based pressure sensitive adhesive further comprises a solid tackifying agent.

Embodiment 52 is the adhesive tape of any one of embodiments 45 to 51 wherein the rubber-based pressure sensitive adhesive further comprises a multifunctional crosslinking agent.

Embodiment 53 is the adhesive tape of embodiment 44 wherein the pressure sensitive adhesive comprises an acrylate-based pressure sensitive adhesive.

Embodiment 54 is the adhesive tape of embodiment 53 wherein the acrylate-based pressure sensitive adhesive comprises at least one polymerized monofunctional unsaturated monomer and at least one polymerized non-acidic comonomer and/or acidic comonomer.

Embodiment 55 is the adhesive tape of embodiment 54 wherein the least one monofunctional unsaturated monomer is selected from the group of (meth)acrylate esters of non-tertiary alkyl alcohols having 4 to 12 carbon atoms, and mixtures thereof.

Embodiment 56 is the adhesive tape of embodiment 55 wherein the (meth)acrylate esters of non-tertiary alkyl alcohols have the following general Formula (I):

Formula (I)

wherein R¹ is H or CH₃; R² is selected from linear or branched hydrocarbon groups and may contain one or more heteroatoms.

Embodiment 57 is the adhesive tape of any one of embodiments 54 to 56 wherein the at least one non-acidic comonomer is selected from N,N-dimethyl acrylamide, N,N-diethyl acrylamide, tert-octyl acrylamide, N,N-dimethyl methacrylamide, N,N-diethyl methacrylamide, n-octyl acrylamide, and mixtures thereof.

Embodiment 58 is the adhesive tape of any one of embodiments 54 to 57 wherein the acidic co-monomer is selected from ethylenically unsaturated carboxylic acids, ethylenically unsaturated sulfonic acids, ethylenically unsaturated phosphonic acids, and mixtures thereof.

Embodiment 59 is the adhesive tape of any one of embodiments 1 to 58 wherein the primer layer has a total thickness of at least 0.01 mil (0.254 micron).

Embodiment 60 is the adhesive tape of any one of embodiments 1 to 59 wherein the primer layer has a total thickness of up to 6 mils (152.4 microns).

Embodiment 61 is the adhesive tape of any one of embodiments 1 to 60 wherein the backing has a total thickness of at least 1 mil (25.4 microns).

Embodiment 62 is the adhesive tape of any one of embodiments 1 to 61 wherein the backing has a total thickness of up to 30 mils (762 microns).

Embodiment 63 is the adhesive tape of any one of embodiments 1 to 62 wherein the adhesive layer has a total thickness of at least 0.2 mil (5.08 microns).

Embodiment 64 is the adhesive tape of any one of embodiments 1 to 63 wherein the adhesive layer has a total thickness of up to 10 mils (254).

Embodiment 65 is the adhesive tape of any one of embodiments 1 to 64 wherein the backing is a multilayer film.

Embodiment 66 is the adhesive tape of embodiment 65 wherein the multilayer film backing comprises at least 2, or at least 3, or at least 4, or at least 5 layers.

Embodiment 67 is the adhesive tape of embodiment 65 or 66 wherein the multilayer film backing comprises up to 15, or up to 14, or up to 13, or up to 12, or up to 11, or up to 10 layers.

Embodiment 68 is the adhesive tape of any one of embodiments 65 to 67 wherein the multilayer film backing comprises a core and two surface layers.

Embodiment 69 is the adhesive tape of embodiment 68 wherein the core comprises one or more layers.

Embodiment 70 is the adhesive tape of embodiment 69 wherein at least one layer of the core comprises one or more fillers.

Embodiment 71 is the adhesive tape of any one of embodiments 68 to 70 wherein each surface layer comprises one or more fillers.

Embodiment 72 is the adhesive tape of embodiment 70 or 71 wherein the amount and/or type of filler in the core is different than the amount and/or type of filler in the surface layers.

Embodiment 73 is the adhesive tape of any one of embodiments 65 to 72 wherein each layer may be the same or different (e.g., same or different type and/or amount of filler, same or different type and/or amount of organic polymer, same or different type and/or amount of polyvinyl chloride, same or different type and/or amount of plasticizer).

Embodiment 74 is the adhesive tape of any one of embodiments 1 to 73 which demonstrates an adhesive backing anchorage of at least 35 Newtons per decimenter (N/dm) after heat aging at 65° C. for 48 hours.

Examples

Materials

| Designation | Description |
|---|---|
| Vinyl resin | GEON Vinyl Flexible B6500 Flexible Polyvinyl Chloride from PolyOne (Avon Lake, OH). |
| Wingtack PLUS | WINGTACK PLUS, C5, C9 is a highly aliphatic tackifiying resin available from Total Cray Valley (Exton, PA). |
| Endex 160 | ENDEX 160 Hydrocarbon Resin, a water-white thermoplastic end blocking resin made from purified aromatic hydrocarbon monomers available from Eastman Chemical Company (Kingsport, TN). |
| E741 | ELVALOY 741, EVA-CO copolymer is an ethylene/vinyl acetate/carbon monoxide (E/VA/CO) copolymer available from Dupont Company (Wilmington, DE). |
| E4924 | ELVALOY 4924, EVA-CO copolymer is an ethylene/vinyl acetate/carbon monoxide (E/VA/CO) copolymer available from Dupont Company (Wilmington, DE). |
| D1161 | KRATON D1161 Polymer is a clear, linear triblock copolymer based on styrene and isoprene, with a polystyrene content of 15% available from Kraton Corporation (Houston, TX). |
| N2210 | NATSYN 2210 is a high cis-1,4 (98.5% Typical) polyisoprene containing a nonstaining antioxidant available from Goodyear Chemical (Akron, OH). |
| Bynel 3101 | BYNEL 3101 Resin is an acid/acrylate-modified ethylene vinyl acetate polymer available from Dupont Company (Wilmington, DE). |
| EPO | EPOFRIEND AT501 is an epoxy-modified styrene-butadiene-styrene copolymer available from Daicel Corporation (Fort Lee, NJ). |

Adhesive Backing Anchorage Test Method

A stainless steel plate was covered with double-coated tape (3M 411 tape available from 3M Company, St. Paul, Minn.). A 25.4 cm to 30.5 cm long specimen 2.54 cm wide was placed on the tape with the vinyl against the double-coated tape and the adhesive facing up. A half-inch (1.27 cm) wide piece of tape (3M 2525 tape available from 3M Company) was adhered to the adhesive from the sample so that the adhesive from the 3M 2525 tape and the adhesive from the sample were in contact. The force required to peel the tape at an angle of 180 degrees was measured in ounces per 0.5 inch (1.27 cm) with a platen speed of 90 inches per minute (228 cm/minute) for the samples before heat aging and at 12 inches/minute (30.5 cm/minute) for the samples after heat aging at 65° C. for 48 hours. The average of at least 3 samples was calculated and the failure mode was recorded. Results are provided in Tables 1 and 2.

Preparation of the Vinyl Backing

The vinyl packing was formed by feeding the pre-compounded vinyl resin (plasticized polyvinyl chloride GEON B6500) into a 1-inch diameter single screw extruder now available from Davis-Standard, LLC (Pawcatuck, Conn.) that was outfitted with a 6-inch (15.24-cm) film die now available from Nordson Extrusion Dies Industries, LLC (Chippewa Falls, Wis.). The extruder and die temperatures were set to 350° F. (177° C.), and the extruder ran at 25 revolutions per minute. The film was extruded to obtain a thickness of approximately 4 mil (101.6 microns).

Pressure Sensitive Adhesive Formulations

Examples were prepared using a compounding and coating apparatus for processing natural and synthetic non-thermoplastic elastomer hot melt based PSA described in U.S. Reissue Pat. No. 36,855 (Bredahl et al.).

Styrene-isoprene-styrene block copolymer (KRATON D1161) was fed into Barrel Section 1 of a 30 mm diameter fully intermeshing co-rotating TSE (Werner-Pfleiderer (now Coperion GmbH) Model ZSK-30, having a L/D of 36:1) having conveying and kneading sections, at a rate of 18.0 grams/minute (g/min) using a K-Tron (Coperion K-Tron, Sewell, N.J.), loss-in-weight feeder which continuously monitored the weight of the material in the hopper. A C5, C9 WINGTACK PLUS highly aliphatic tackifiying resin was added into Barrel Zone 1 of the twin screw extruder at a rate of 3.6 g/min using a K-Tron loss-in-weight feeder which continuously monitored the weight of the material in the hopper. Cis-1,4 polyisoprene resin (NATSYN 2210) was added into Barrel Zone 2 of the twin screw extruder at a rate of 18.0 g/min using a bulk feeder available from Bonnot Company (Green, Ohio, Model No, B-6661), a 3.0 cc/rev ZENITH gear pump (Zenith Pumps/Colfax Corporation, Monroe, N.C.) and a flexible hose, all at a temperature of 121° C. An additional 25.2 g/min C5, C9 WINGTACK PLUS highly aliphatic tackifiying resin was added to Barrel Zone 4 of the twin screw extruder using a K-iron loss-in-weight feeder which continuously monitored the weight of the material in the hopper. A thermoplastic end block associating hydrocarbon resin (ENDEX 160) was added at a rate of 10.8 g/min to Barrel Zone 6 of the twin screw extruder using a K-iron loss-in-weight feeder which continuously monitored the weight of the material in the hopper.

Barrel Zone 1 was set at a temperature of 60° C. Barrel Zone 2 was set at a temperature of 66° C. Barrel Zone 3 was set at a temperature of 66° C. Barrel Zone 4 was set at a temperature of 66° C. Barrel Zone 5 was set at a temperature of 93° C. Barrel Zone 6 was set at a temperature of 93° C. Barrel Zones 7 through 12 were set at a temperature of 149° C. The adhesive was transported through the remaining zones of the extruder and delivered to a 3.0 cm³/revolution ZENITH gear pump (Zenith Pumps/Colfax Corporation, Monroe, N.C.). The gear pump was set to deliver 75.6 g/min of adhesive to a 6-inch extrusion die as described in U.S. Reissue Pat. No. 36,855 (Bredahl et al.) set at a temperature of 149° C. which coated the adhesive on a commercial release liner. An adhesive film was produced having a thickness of approximately 1.2 mils (30.5 microns).

Examples

The primer layer materials were fed into a 1-inch (2.54-cm) diameter single screw extruder now available from Davis-Standard, LLC (Pawcatuck, Conn.) that was outfitted with a 6-inch film die now available from Nordson Extrusion Dies Industries, LLC (Chippewa Falls, Wis.). The extruder and die temperatures were set to 350° F. (177° C.), and the extruder ran at 25 revolutions per minute. The film was extruded to obtain a thickness of approximately 4 mil (101.6 microns). Thirty-inch (0.76-m) samples of the prepared vinyl backing material were applied to the surface of the primer layer and laminated together by feeding through a nip roll (at 50° C.).

The adhesive film was applied to an exposed surface of the primer layer of the primer/vinyl construction via a heated lamination process at 90° C. on an LPA 3301 laminator, available from Fujipla, Inc. at a speed setting of 2. The constructions were passed through the laminator twice.

Adhesive backing anchorage was measured before and after heat aging at 65° C. for 48 hours. Results of these measurements are provided in Tables 1 and 2, respectively.

TABLE 1

Adhesive bond anchorage measurement results prior to heat aging

| Sample | Primer Layer | Weight Ratio of Components | Average (N/dm) | Failure Mode |
|---|---|---|---|---|
| C1 | D1161 | 100 | 30.1 | Primer/Backing |
| C2 | BYNEL 3101 | 100 | 44.7 | Mixed Primer/Backing and Adhesive/Primer |
| 1 | EPO/E4924/D1161 | 5:45:50 | 45.9 | Adhesive/Primer |
| 2 | E4924/D1161 | 50:50 | 52.3 | Primer/Backing |
| 3 | Bynel 3101/E741 | 50:50 | 131.3 | Mixed Adhesive/Primer and No Failure |
| 4 | E4924 | 100 | 53.2 | Adhesive/Primer |

TABLE 2

Adhesive bond anchorage measurement results after heat aging

| Sample | Primer Layer | Average (N/dm) | Failure Mode |
|---|---|---|---|
| C1 | D1161 | 29.6 | Primer Split |
| C2 | Bynel 3101 | 0.7 | Primer/Backing |
| 1 | EPO/E4924/D1161 | 56.9 | Adhesive/Primer |
| 2 | E4924/D1161 | 42.7 | Primer Split |
| 3 | Bynel 3101/E741 | 52.1 | Mixed: Adhesive Split and Adhesive/Primer |
| 4 | E4924 | 94.2 | Adhesive/Primer |

The complete disclosures of the patents, patent documents, and publications cited herein are incorporated by reference in their entirety as if each were individually incorporated. Various modifications and alterations to this disclosure will become apparent to those skilled in the art without departing from the scope and spirit of this disclosure. It should be understood that this disclosure is not intended to be unduly limited by the illustrative embodiments and examples set to forth herein and that such examples and embodiments are presented by way of example only with the scope of the disclosure intended to be limited only by the claims set forth herein as follows.

What is claimed is:
1. An adhesive tape comprising:
a backing comprising a plasticized polyvinyl chloride;
a primer layer disposed on at least one major surface of the backing, wherein the primer comprises an ethylene/carbon monoxide-containing terpolymer and a second ethylene-containing copolymer or terpolymer comprising one or two comonomers having a polarity greater than that of ethylene; and an adhesive layer disposed on the primer layer.

2. The adhesive tape of claim 1 wherein the primer layer is solventless.

3. The adhesive tape of claim 1 wherein the ethylene/carbon monoxide-containing terpolymer comprises a third monomer selected from vinyl acetate, n-butyl acrylate, and a combination thereof.

4. The adhesive tape of claim 1 wherein the ethylene/carbon monoxide-containing terpolymer comprises: (a) 20 wt-% to 80 wt-% ethylene monomer; (b) 3 wt-% to 30 wt-% carbon monoxide monomer; and (c) 5 wt-% to 60 wt-% of a third monomer, wherein the percentages are based on the total weight of the terpolymer.

5. The adhesive tape of claim 4 wherein the third monomer is vinyl acetate.

6. The adhesive tape of claim 1 wherein the comonomers of the second ethylene-containing copolymer or terpolymer having a greater polarity than that of ethylene are selected from acids, acetates, epoxies, acrylates, and combinations thereof.

7. The adhesive tape of claim 6 wherein the comonomers having a greater polarity than that of ethylene are selected from vinyl acetate, acrylic acid, methyl (meth)acrylate, ethyl acrylate, glycidyl methacrylate, anhydride-functional monomers, n-butyl acrylate, and combinations thereof.

8. The adhesive tape of claim 1 wherein the ethylene-containing copolymer or terpolymer is present in the primer layer in an amount of 5 wt-% to 95 wt-%, based on the total weight of the primer.

9. The adhesive tape of claim 1 wherein the backing comprises one or more fillers.

10. The adhesive tape of claim 1 wherein the plasticized polyvinyl chloride backing comprises 10 wt-% to 60 wt-% of one or more plasticizers, based on the total weight of the plasticized polyvinyl chloride.

11. The adhesive tape of claim 1 wherein the adhesive is a pressure sensitive adhesive and comprises an emulsion pressure sensitive adhesive, a solvent-borne pressure sensitive adhesive, a photo-polymerizable pressure sensitive adhesive, a hot melt pressure sensitive adhesive, or a combination thereof.

12. The adhesive tape of claim 11 wherein the pressure sensitive adhesive comprises a rubber-based pressure sensitive adhesive.

13. The adhesive tape of claim 11 wherein the pressure sensitive adhesive comprises an acrylate-based pressure sensitive adhesive.

* * * * *

UNITED STATES PATENT AND TRADEMARK OFFICE
CERTIFICATE OF CORRECTION

PATENT NO.      : 10,774,245 B2
APPLICATION NO. : 15/972879
DATED           : September 15, 2020
INVENTOR(S)     : Jeff Emslander Page 1 of 1

It is certified that error appears in the above-identified patent and that said Letters Patent is hereby corrected as shown below:

In the Specification

Column 9,
Line 36, delete "EPDXYPRENE" and insert -- EPOXYPRENE -- therefor.

Column 23,
Line 40, delete "K-iron" and insert -- K-Tron -- therefor.
Line 45, delete "K-iron" and insert -- K-Tron -- therefor.

Column 24,
Line 57, after "set" delete "to".

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*